(12) United States Patent
Vandewiele et al.

(10) Patent No.: US 10,240,024 B2
(45) Date of Patent: Mar. 26, 2019

(54) NUCLEATING COMPOSITION AND THERMOPLASTIC POLYMER COMPOSITION COMPRISING SUCH NUCLEATING COMPOSITION

(71) Applicants: SAUDI BASIC INDUSTRIES CORPORATION, Riyadh (SA); SABIC Global Technologies B.V., Bergen op Zoom (NL)

(72) Inventors: Kathleen Ann Vandewiele, Diepenbeek (BE); Peter Heinrich Angeline Marcus Mintjens, Geleen (NL); Gerard Jan Eduard Biemond, Brunssum (NL); Diederik Margaretha Goyvaerts, Geleen (NL); Marc Herklots, Roermond (NL); Paul Hans Pieter Wanrooij, Geleen (NL)

(73) Assignees: SAUDI BASIC INDUSTRIES CORPORATION, Riyadh (SA); SABIC GLOBAL TECHNOLOGIES B.V, Bergen op Zoom (NL)

(*) Notice: Subject to any disclaimer, the term of this patent is extended or adjusted under 35 U.S.C. 154(b) by 0 days.

(21) Appl. No.: 15/869,177

(22) Filed: Jan. 12, 2018

(65) Prior Publication Data
US 2018/0134868 A1   May 17, 2018

Related U.S. Application Data

(62) Division of application No. 14/895,240, filed as application No. PCT/EP2014/062714 on Jun. 17, 2014.

(30) Foreign Application Priority Data

| Jun. 20, 2013 | (EP) | 13173015 |
| Jun. 20, 2013 | (EP) | 13173016 |
| Aug. 19, 2013 | (EP) | 13180920 |
| Aug. 19, 2013 | (EP) | 13180921 |
| Oct. 7, 2013 | (EP) | 13187541 |
| Oct. 7, 2013 | (EP) | 13187542 |

(51) Int. Cl.
| C08K 5/092 | (2006.01) |
| C08K 5/098 | (2006.01) |
| C08L 23/12 | (2006.01) |
| C08K 3/34 | (2006.01) |
| C08L 23/10 | (2006.01) |
| C08K 5/14 | (2006.01) |
| C08L 23/16 | (2006.01) |

(52) U.S. Cl.
CPC ............ *C08K 5/092* (2013.01); *C08K 3/34* (2013.01); *C08K 3/346* (2013.01); *C08K 5/098* (2013.01); *C08K 5/14* (2013.01); *C08L 23/10* (2013.01); *C08L 23/12* (2013.01); *C08L 23/16* (2013.01); *C08L 2205/02* (2013.01); *C08L 2205/24* (2013.01); *C08L 2207/02* (2013.01)

(58) Field of Classification Search
CPC ................................................. C08K 5/092
See application file for complete search history.

(56) References Cited

U.S. PATENT DOCUMENTS

| 8,642,683 B1 | 2/2014 | Dellock et al. |
| 2004/0220311 A1 | 11/2004 | Dotson et al. |
| 2005/0038155 A1 | 2/2005 | Berghmans et al. |
| 2005/0101713 A1 | 5/2005 | Lake, Jr. et al. |
| 2007/0066733 A1 | 3/2007 | Hanssen et al. |
| 2007/0093605 A1 | 4/2007 | Adur |
| 2007/0213439 A1* | 9/2007 | Wolters ............... C08K 5/0083 524/321 |
| 2008/0171834 A1 | 7/2008 | Tang et al. |
| 2011/0136959 A1 | 6/2011 | Brandstetter et al. |
| 2012/0242003 A1 | 9/2012 | Forgue et al. |
| 2013/0253124 A1 | 9/2013 | Bernreiter et al. |
| 2014/0287215 A1 | 9/2014 | Chandak et al. |
| 2014/0364553 A1 | 12/2014 | Zhao |

(Continued)

FOREIGN PATENT DOCUMENTS

| CN | 101268131 A | 9/2008 |
| CN | 102558683 A | 7/2012 |
| CN | 102947385 A | 2/2013 |

(Continued)

OTHER PUBLICATIONS

International Search Report and Written Opinion of the International Searching Authority for PCT/EP2014/062714 dated Aug. 14, 2014, 7 pages.

(Continued)

*Primary Examiner* — Arrie L Reuther
(74) *Attorney, Agent, or Firm* — Cantor Colburn LLP

(57) ABSTRACT

The invention relates to a nucleating composition comprising:
(a) a first nucleating agent, which comprises a cyclic dicarboxylate salt compound; and
(b) a second nucleating agent, which comprises talc,
wherein the cyclic dicarboxylate salt compound has the formula (I):

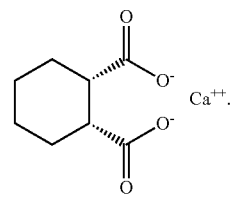

20 Claims, No Drawings

(56) References Cited

U.S. PATENT DOCUMENTS

2016/0122505 A1    5/2016   Vandewiele et al.

FOREIGN PATENT DOCUMENTS

| EP | 1379368 B1 | 12/2006 |
| WO | 2006071721 A1 | 7/2006 |

OTHER PUBLICATIONS

International Search Report and Written Opinion of the International Searching Authority for PCT/EP2014/062715 dated Sep. 11, 2014, 5 pages.

Libster, Dima, et al., "Advanced nucleating agents for polypropylene", Polymers for Advanced Technologies, (2007) 18: 685-695.

* cited by examiner

NUCLEATING COMPOSITION AND THERMOPLASTIC POLYMER COMPOSITION COMPRISING SUCH NUCLEATING COMPOSITION

CROSS REFERENCE TO RELATED APPLICATIONS

This application is a divisional of U.S. patent application Ser. No. 14/895,240, filed Dec. 2, 2015, which claims benefit of International Application No. PCT/EP2014/062714, filed Jun. 17, 2014, which claims priority to EP13173015.2 filed Jun. 20, 2013, EP13173016.0 filed Jun. 20, 2013, EP13180921.2 filed Aug. 19, 2013, EP13180920.4 filed Aug. 19, 2013, EP13187541.1 filed Oct. 7, 2013, and EP13187542.9 filed Oct. 7, 2013, which are hereby incorporated by reference in their entirety.

The invention relates to a nucleating composition comprising a salt of a metal or organic cation of a cyclic dicarboxylic acid as a first nucleating agent. The invention also relates to a thermoplastic polymer composition comprising said nucleating composition. The invention further relates to a shaped article comprising said thermoplastic polymer composition.

Such a nucleating composition is known from document EP 1379368 B1. This document discloses at least one metal salt of hexahydrophthalic acid (HHPA), e.g. calcium, strontium, lithium and monobasic aluminium salt, to be used as nucleating agent to produce thermoplastic compositions showing improved crystallization behaviour.

Several other documents also disclose metal salts employed as nucleating additives for thermoplastics. For example, US 2004/0220311 A1 discloses the use of a specific hexahydrophthalic acid metal salt, e.g. calcium, strontium, lithium, or monobasic aluminium, as nucleating agent in various thermoplastics, particularly in polypropylene compositions. WO 2006/071721 discloses a thermoplastic composition comprising a polyolefin; a nucleating agent comprising a dicarboxylate salt compound, e.g. bicyclic [2.2.1] heptane dicarboxylate salt, available from Milliken & Company under the trade name Hyperform® HPN-68; a first fatty acid salt having a first cationic counter ion selected from the group consisting of calcium, sodium, lithium and barium, e.g. calcium stearate; and a second fatty acid salt having a second cationic counter ion selected from the group of magnesium, aluminium and zinc, e.g. zinc stearate.

Nucleating agents are chemical compounds or compositions that enable faster nucleation or a higher crystallization temperature of thermoplastic polymers, resulting in productivity gains during their processing and in improved mechanical and physical properties of articles made from such thermoplastics. These compounds provide nucleation sites for crystal growth during cooling of a thermoplastic molten composition. In polypropylenes, for example, a higher degree of crystallinity and more uniform crystalline structure is obtained by adding a nucleating agent such as talc and carboxylate salts, e.g. sodium benzoate. An overview of nucleating agents used in polypropylene-based compositions is given for example in *Polym. Adv. Technol.* 2007, 18, 685-695. However, it is commonly recognized that the use of nucleating agents is a highly unpredictable technology area. Small changes in a molecular structure of the nucleator can drastically alter the ability of a nucleating agent to nucleate effectively a polymer composition. There are still many unknowns regarding the effect of a nucleating agent on polymer morphology during (re-)crystallization of thermoplastics.

A nucleating composition is known from document EP 1379368 B1. This document discloses at least one metal salt of hexahydrophthalic acid (HHPA), e.g. calcium, strontium, lithium and monobasic aluminium salt, to be used as nucleating agent to produce thermoplastic compositions showing improved crystallization behavior.

Several other documents also disclose metal salts employed as nucleating additives for thermoplastics. For example, US 2004/0220311 A1 discloses the use of a specific hexahydrophthalic acid metal salt, e.g. calcium, strontium, lithium, or monobasic aluminium, as nucleating agent in various thermoplastics, particularly in polypropylene compositions. WO 2006/071721 discloses a thermoplastic composition comprising a polyolefin; a nucleating agent comprising a dicarboxylate salt compound, e.g. bicyclic [2.2.1] heptane dicarboxylate salt, available from Milliken & Company under the trade name Hyperform® HPN-68; a first fatty acid salt having a first cationic counter ion selected from the group consisting of calcium, sodium, lithium and barium, e.g. calcium stearate; and a second fatty acid salt having a second cationic counter ion selected from the group of magnesium, aluminium and zinc, e.g. zinc stearate.

There is a demand for improving the mechanical properties of a thermoplastic composition such as the flexural modulus and the impact strength.

It is an object of the invention to provide a nucleating agent composition which results in highly improved mechanical properties of a thermoplastic composition such as the flexural modulus and the impact strength.

The objective is achieved according to the invention with a nucleating composition comprising:

(a) a first nucleating agent which comprises a cyclic dicarboxylate salt compound; and (b) a second nucleating agent which comprises talc, wherein the cyclic dicarboxylate salt compound has the formula (I):

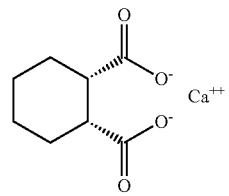 [SMILES: O=C([O-])[C@H]1CCCC[C@H]1C(=O)[O-] ; [Ca+2]]

Surprisingly, the nucleating composition of present invention results in highly improved mechanical properties such as stiffness and impact.

Document US 2007/0213439 A1 also discloses a nucleating composition comprising a mixture of two nucleating agents, the first nucleating agent comprising a dicarboxylate calcium salt, known as Hyperform® HPN-20E, but in this document the second nucleating agent comprises a bicyclic [2.2.1] heptane dicarboxylate salt, particularly Hyperform® HPN-68L. Also US 2008/0171834 A1 discloses a dicarboxylate calcium salt as first nucleating agent, but uses a bis-phenol phosphate compound as second nucleating agent in the nucleating composition. Thus, these references do not disclose nor suggest applying talc as nucleating agent in combination with a dicarboxylate calcium salt.

Additional advantages of the nucleating composition according to the present invention include decreased warpage of shaped articles made from a nucleated thermoplastic polymer composition; higher heat deflection temperature (HDT) and improved top load.

Additional advantages of the nucleating composition according to the present invention include a lower shrinkage caused by temperature change of shaped articles made from a nucleated thermoplastic polymer composition, as determined by Coefficient of Linear Thermal Expansion (CLTE) measured according to ASTM D696. The CLTE measures the change in length per unit length of a material per unit change in temperature. Expressed as in/in/° F. or cm/cm/° C., the CLTE is used to calculate the dimensional change resulting from thermal expansion. CLTE is especially important when components of an assembly have widely varying thermal expansion coefficients. Thermal expansion of a material is another important design factor, particularly in applications where plastic parts composed of polymer components are mated with metal parts or parts having metal inserts. Shrinkage can also be determined according to ISO 294-4 (shrinkage 3-D).

The advantages of the nucleating composition according to the present invention include one or combinations of the following favorable properties: flexural modulus, impact strength, CLTE and shrinkage.

The first nucleating agent in the composition according to the present invention comprises a calcium cis-hexahydrophthalate compound of Formula (I).

Hyperform® HPN-20E™ nucleating agent commercialized by Milliken comprises such a calcium cis-hexahydrophthalate compound of Formula (I) and a stearate-containing compound as acid scavenger, e.g. zinc stearate.

The nucleating composition according to the present invention comprises talc as second nucleating agent.

Talc is a common additive in industry, mostly used as reinforcing agent or filler and also as nucleating agent for various polymer compositions. Talc typically is considered a filler when employed in relatively high amounts, for example of about from 10 to 50 wt %, based on the total polymer composition. When talc is used under 5 wt %, it is no longer considered a filler but acts as nucleating agent.

Talc may be employed in present invention in powder form, preferably having a particle size distribution defined by a $d_{50}$ of from 0.1 to 20 □m; more preferably of from 0.5 to 15 □m; or from 0.7 to 8 □m to improve its nucleating behaviour.

The first nucleating agent and the second nucleating agent can be present in the nucleating composition according to the invention in widely varying amounts, for example in a weight ratio of from 1:1200 to 2:1; preferably in a ratio of from 1:500 to 1:1; more preferably in a ratio of from 1:100 to 1:2; even more preferably in a ratio of from 1:50 to 1:5. The advantage of adding these components within these ratio limits lies in the possibility to control dimensional stability at fast cycle times and mechanical properties.

The nucleating composition may be employed as powder, dry mix or liquid blend. It may be also mixed with other additives to form an additive pre-blend or it may be blended with a binder material in low concentrations, such as a wax or thermoplastic polymer that is compatible with the polymer for which the composition is intended to serve as nucleating agent. The nucleating composition can also be combined with a thermoplastic polymer as a masterbatch or concentrate. These blends may be provided, optionally, with acid scavengers and other additives, such as stabilizers; primary and secondary antioxidants. Suitable acid scavengers can include zinc stearate, calcium stearate or other stearate-based compounds, and hydrotalcite.

The invention also relates to a thermoplastic polymer composition comprising a thermoplastic polymer and the nucleating composition according to present invention. As used herein, the term "thermoplastic" refers to a polymeric material that melts upon exposure to sufficiently high temperatures, but re-solidifies (crystallizes) upon cooling. "Thermoplastic" particularly defines polymers having (semi-)crystalline morphology upon cooling. Suitable examples of thermoplastic polymers include polyamides, such as polyamide-6, polyamide-6,6 or polyamide-4,6; polyolefins like polypropylenes, polyethylenes, polybutylene; polyesters, such as polyethylene terephthalate, polybutylene terephthalate; polyphenylene sulphide; polyurethanes; as well as any type of polymer blends and compounds and any combinations thereof. Preferably, the thermoplastic polymer is a crystallisable polypropylene, like a propylene homopolymer, a random copolymer, or a so-called heterophasic or impact copolymer of propylene and ethylene and/or another alpha-olefin.

In a preferred embodiment of the invention, the thermoplastic polymer is a heterophasic polypropylene copolymer. Such copolymer basically has at least a two-phase structure, consisting of a propylene-based semi-crystalline matrix and a dispersed elastomer phase, typically an ethylene-propylene rubber (EPR). These polypropylenes are generally prepared in one or more reactors, by polymerization of propylene in the presence of a catalyst system, and subsequent polymerization of a propylene-ethylene mixture; but can also be made by blending different (co)polymers. The resulting polymeric materials are heterophasic; studies have demonstrated the presence of four phases in heterophasic propylene-based copolymers: crystalline polypropylene, amorphous polypropylene, crystalline ethylene-propylene rubber, and amorphous ethylene-propylene rubber. The advantage of such polymer is improved impact resistance, especially at lower temperatures.

Preferably, the thermoplastic polymer is a heterophasic propylene copolymer comprising a matrix phase comprising propylene and a dispersed phase comprising an ethylene-alpha-olefin elastomer.

Preferably, the heterophasic propylene copolymer comprises from 60 to 92 wt % of a matrix phase comprising a propylene homopolymer and/or a propylene copolymer comprising at least 90 wt % of propylene and up to 10 wt % of ethylene and/or at least one $C_4$ to $C_{10}$ alpha-olefin, and from 8 to 40 wt % of dispersed phase comprising an ethylene-alpha-olefin elastomer comprising from 40 to 65 wt % of ethylene and from 35 to 60 wt % of at least one $C_3$ to $C_{10}$ alpha-olefin, preferably propylene. The percentage of matrix and dispersed component is based on the total weight of the heterophasic propylene copolymer; comonomer contents are based on copolymer component.

Preferably, the matrix phase is a propylene homopolymer and the mass dispersed phase is an ethylene-alpha-olefin elastomer comprising from 40 to 65 wt % of ethylene and from 35 to 60 wt % of propylene.

The thermoplastic polymer composition according to present invention preferably contains of from 0.0025 to 0.1 wt % of the first nucleating agent based on the total thermoplastic polymer composition. A certain minimum amount of the first nucleating agent is needed to effectively influence nucleating behaviour and properties the polymer composition further comprising talc as nucleating agent; preferably, the nucleating composition contains therefore at least 0.004, 0.005, 0.008, 0.01 wt % of the first nucleating agent. Further increasing the amount of the first nucleating agent in the composition to above 0.1 wt % would hardly contribute to improving the properties of final product. Preferably, the nucleating composition thus contains at most 0.08, 0.06, 0.05, 0.03 wt % of the first nucleating agent. It is a special advantage of the present invention that a relatively low amount of the first nucleating agent can be applied, in combination with the talc-based second nucleating agent; giving not only improved performance but also reducing costs.

The amount of talc used as second nucleating agent in the polymer composition is preferably of from 0.1 to 5 wt %, more preferably from 0.2 to 4 wt %; or from 0.3 to 3 wt %, based on the total thermoplastic polymer composition. A certain minimum amount of talc is necessary to provide nucleating effect and good mechanical characteristics, such as stiffness. Preferably, the nucleation composition contains thus at least 0.2, 0.3 or even 0.5 wt % of talc. If the nucleating composition would contain more than 3 wt % of talc, the additional amount might only behave as filler agent. Preferably, the nucleation composition contains therefore at most 4 or 3 wt % of talc.

Medium to High MFI of Heterophasic Propylene Copolymer

The heterophasic propylene copolymer of the thermoplastic polymer composition according to the invention preferably has a MFI of at least 1 as determined by ISO 1133 at 230° C.; 2.16 kg. In this case, the thermoplastic polymer composition further comprises an organic peroxide.

Organic peroxides are known to be used for viscosity reduction. There are different ways in which the organic peroxides behave in conventional degradation processes upon heating and melting conditions. On one hand, under certain process conditions, the peroxides initially decompose to produce free radicals, which then abstract hydrogen from a tertiary carbon of the polypropylene backbone to form free radicals on the polymer, and which further recombine. On the other hand, peroxides initiate a breakage of the longest chains of the polymer molecules and, subsequently, this results in a decrease in viscosity of the polymer, an increase in melt flow rate, and a narrower molecular weight distribution, characteristics which are directly responsible for improved flow properties of polypropylene in order to make the product more suitable for certain applications. The extent of each type of behaviour is generally influenced by the nature and concentration of the peroxide.

Suitable for present invention are organic peroxides having a decomposition half-life of less than 1 minute at the average process temperature during formation of the modified polypropylene compositions. Suitable organic peroxides include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate, and any combination thereof. Preferably, a dialkyl peroxides is employed in the process according to the present invention. More preferably, the peroxide is α,α'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane.

The organic peroxide of present invention may be applied in amount of between 0.01 wt % and 0.3 wt %, preferably between 0.05 and 0.25 wt % and more preferably between 0.1 and 0.2 wt % based on the total composition.

Medium MFI

The heterophasic propylene copolymer of the thermoplastic polymer composition according to the invention may have a MFI of at least 1 and less than 10 dg/min.

The composition according to the invention comprising this type of propylene copolymer having a medium MFI combines very high impact resistance, also at low temperatures, with high stiffness and offers good flow properties. By its design it is offering potential of cycle time reduction (shorter holding pressure times, faster injection speed and shorter cooling time), of down gauging and easiness of processing and better esthetics of the parts, reflected in a better sink mark capability. Due to its narrow molecular weight distribution, the very low tendency to warp and the excellent surface quality, the compositions according to the invention are typically used in injection moulding of suitcase shells, crates & boxes, appliances, electronic equipment and automotive parts including children's car seats. Accordingly, the present invention relates to shells, crates, boxes, appliances, electronic equipment and automotive parts including children's car seats comprising the thermoplastic polymer composition according to the invention comprising this type of propylene copolymer.

Preferably, the propylene homopolymer of the matrix phase has a MFI of at least 1 and less than 50 dg/min, e.g. 1 to 10 dg/min.

Preferably, the ethylene-alpha-olefin elastomer of the dispersed phase has a MFI of 0.01 to 0.5 dg/min.

The mass dispersed phase may be an ethylene-alpha-olefin elastomer comprising from 40 to 60 wt % of ethylene and from 40 to 60 wt % of propylene. The polypropylene composition comprising such a heterophasic propylene copolymer was found to show a very high impact strength as well as a high flexural modulus.

The mass dispersed phase may be an ethylene-alpha-olefin elastomer comprising from 60 to 65 wt % of ethylene and from 35 to 40 wt % of propylene. The polypropylene composition comprising such a heterophaseic propylene copolymer was found to show an extremely high impact strength.

The thermoplastic polymer composition according to the invention wherein the heterophasic propylene copolymer has a MFI of at least 1 and less than 10 dg/min preferably has a MFI of at least 5 and less than 30 dg/min.

The thermoplastic polymer composition according to the invention has a high stiffness. For purpose of the present invention, stiffness is determined by measuring the flexural modulus according to ASTM D790-10. Flexural modulus was determined on 3.2 mm thick specimens according to ISO37/2, parallel (flexural modulus II) and perpendicular (flexural modulus L) orientation.

The thermoplastic polymer composition according to the invention wherein the heterophasic propylene copolymer has a MFI of at least 1 and less than 10 dg/min preferably has a flexural modulus L of at least 1000 MPa, preferably at least 1100 MPa, more preferably at least 1200 MPa.

The thermoplastic polymer composition according to the invention wherein the heterophasic propylene copolymer has a MFI of at least 1 and less than 10 dg/min preferably has a flexural modulus II of at least 1000 MPa, preferably at least 1100 MPa, more preferably at least 1200 MPa.

The thermoplastic polymer composition according to the invention has a high impact strength. For purpose of the present invention, impact strength is determined by measuring the Izod impact strength at 23° C. according to ISO 180 4A, Test geometry: 65*12.7*3.2 mm, notch 45° according to ISO 37/2 parallel and perpendicular orientation.

The thermoplastic polymer composition according to the invention wherein the heterophasic propylene copolymer has a MFI of at least 1 and less than 10 dg/min preferably has an Izod impact strength L (23° C., kJ/m2) of at least 55, preferably at least 60.

The thermoplastic polymer composition according to the invention wherein the heterophasic propylene copolymer has a MFI of at least 1 and less than 10 dg/min preferably has an Izod impact strength II (23° C., kJ/m2) of at least 5, preferably at least 6, more preferably at least 7, more preferably at least 8.

High MFI

The heterophasic propylene copolymer may have a MFI of at least 10 dg/min, preferably at most 90 dg/min, e.g. 20 to 50 dg/min, as determined by ISO 1133 at 230° C.; 2.16 kg.

The thermoplastic polymer composition according to the invention comprising this type of propylene copolymer is typically used in thin wall packing applications both for food and non-food segments. This includes pails and containers and yellow fats/margarine tubs and dairy cups. Materials have a good heat deflection temperature making it particularly suitable for hot fill applications. The composition according to the invention combine a high crystallization temperature, good flow behaviour in combination with an improved stiffness and good impact performance, also at low temperatures. Accordingly, the present invention relates to thin wall packing applications comprising the thermoplastic polymer composition according to the invention comprising this type of propylene copolymer.

Preferably, the heterophasic propylene copolymer having a MFI of at least 10 d/gmin as determined by ISO 1133 at 230° C.; 2.16 kg comprises from 60 to 80 wt %, more preferably 65 to 75 wt %, of a matrix phase comprising a propylene homopolymer and/or a propylene copolymer comprising at least 90 wt % of propylene and up to 10 wt % of ethylene and/or at least one $C_4$ to $C_{10}$ alpha-olefin, and from 20 to 40 wt % of, more preferably 25 to 35 wt %, of dispersed phase comprising an ethylene-alpha-olefin elastomer comprising from 40 to 65 wt % of ethylene and from 35 to 60 wt % of at least one $C_3$ to $C_{10}$ alpha-olefin, preferably propylene. The thermoplastic polymer composition according to the invention comprising this type of propylene copolymer with a relatively large amount of rubber shows a particularly desirable shrinkage property. Such polymer composition is especially suitable for thin wall packaging.

Preferably, the propylene homopolymer of the matrix phase has a MFI of at least 50 dg/min, preferably at least 75 dg/min and preferably at most 90 dg/min.

Preferably, the ethylene-alpha-olefin elastomer of the dispersed phase has a MFI of 0.1 to 10 dg/min, e.g. 0.3 to 5 dg/min.

The thermoplastic polymer composition according to the invention wherein the heterophasic propylene copolymer has a MFI of at least 10 dg/min preferably has a MFI of at least 30 dg/min, e.g. 40 to 60 dg/min.

The thermoplastic polymer composition according to the invention wherein the heterophasic propylene copolymer has a MFI of at least 10 dg/min preferably has a flexural modulus L of at least 1400 MPa, more preferably at least 1500 MPa.

The thermoplastic polymer composition according to the invention wherein the heterophasic propylene copolymer has a MFI of at least 10 dg/min preferably has a flexural modulus II of 1400 MPa, more preferably at least 1500 MPa.

The thermoplastic polymer composition according to the invention wherein the heterophasic propylene copolymer has a MFI of at least 10 dg/min preferably has an Izod impact strength L (23° C., kJ/m2) of at least 5, preferably at least 6.

The thermoplastic polymer composition according to the invention wherein the heterophasic propylene copolymer has a MFI of at least 10 dg/min preferably has an Izod impact strength II (−20° C., kJ/m2) of at least 5, preferably at least 6

The thermoplastic polymer according to the invention may contain other additives, of which suitable example include clarifiers, stabilizers, e.g. UV stabilizers, acid scavenger, release agents, plasticizers, anti-oxidants, lubricants, anti-statics, scratch resistance agents, recycling additives, coupling agents, anti-microbials, anti-fogging additives, slip additives, anti-blocking additives, polymer processing aids, organic peroxides to control melt rheology, and the like. Such additives are well known in the art. The skilled person will know how to employ these additives in conventional effective amounts.

The thermoplastic polymer composition according to the invention may also contain one or more of usual additives, like those mentioned above, including stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; impact modifiers; blowing agents; fillers and reinforcing agents; and/or components that enhance interfacial bonding between polymer and filler, such as a maleated polypropylene, in case the thermoplastic polymer is a polypropylene composition. The skilled person can readily select any suitable combination of additives and additive amounts without undue experimentation. The amount of additives depends on their type and function; typically is of from 0 to about 30 wt %; preferably of from 0 to about 20 wt %; more preferably of from 0 to about 10 wt % and most preferably of from 0 to about 5 wt % based on the total composition.

The thermoplastic polymer composition of the invention may be obtained by mixing the nucleating composition according to present invention with the thermoplastic polymer, and optionally other additives by using any suitable means. Preferably, the thermoplastic polymer composition of the invention is made in a form that allows easy processing into a shaped article in a subsequent step, like in pellet or granular form. The composition can be a mixture of different particles or pellets; like a blend of a thermoplastic polymer and a masterbatch of nucleating agent composition, or a blend of pellets of a thermoplastic polymer comprising one of the two nucleating agents and a particulate comprising the other nucleating agent, possibly pellets of a thermoplastic polymer comprising said other nucleating agent. Preferably, the thermoplastic polymer composition of the invention is in pellet or granular form as obtained by mixing all components in an apparatus like an extruder; the advantage being a composition with homogeneous and well-defined concentrations of the nucleating agents (and other components).

The thermoplastic polymer composition may then be processed by any conventional technique known in the art into a shaped article. Suitable examples include injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, and thermoforming.

The invention therefore further relates to a shaped article comprising the thermoplastic polymer composition according to the invention. In particular, when the thermoplastic polymer of the thermoplastic composition according to the invention is a heterophasic propylene copolymer having a MFI of at least 1 and less than 10 dg/min, suitable articles include shells, crates, boxes, appliances automotive exterior parts like bumpers, automotive interior parts like instrument panels and automotive parts under the bonnet. When the thermoplastic polymer of the thermoplastic composition according to the invention is a heterophasic propylene copolymer having a MFI of at least 10 dg/min, suitable articles include thin wall packing applications both for food and non-food segments, including pails and containers and yellow fats/margarine tubs and dairy cups.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The range of values "A to B" used herein is understood to mean "at least A and at most B".

The invention is now elucidated by way of the following examples, without however being limited thereto.

EXAMPLES

Example 1

Several samples were prepared using a starting material having a melt flow index (MFI) of 1.5 dg/min. This material is a propylene heterophasic copolymer having a propylene polymer matrix wherein the propylene-based matrix (in this case a propylene homopolymer) is present in an amount of 75.5 wt % based on the total heterophasic propylene copolymer and 24.5 wt % of an ethylene-propylene copolymer consisting of 56.5 wt % of ethylene.

The heterophasic propylene copolymer (4.1 kg) was extruded in a twin screw ZE21 extruder with 2.5 wt % talcum (Imerys steamic OOSD/G fine talcum) and this material was shifted with 0.12 wt % (based on the total composition) Luperco 802PP40 (di(tert-butylperoxyisopropylbenzene) as the peroxide to the desired melt flow index for the finished material. The formulation of these materials contained in addition 500 ppm of the processing aid Calcium stearate, 2000 ppm of the stabilizer Irganox B225 and 500 ppm HPN20E. The talcum, peroxide, calcium stearate, Irganox B225 and nucleating agent were mixed with the heterophasic copolymer prior to dosing it to the hopper of the extruder.

The temperature profile in the extruder was 20-20-40-100-170-230-240-240-240° C., at a throughput of 2.5 kg/h at 300 rpm.

For purpose of the present invention, stiffness is determined by measuring the flexural modulus according to ASTM D790-10. Flexural modulus was determined on 3.2 mm thick specimens according to ISO37/2, parallel and perpendicular orientation.

For purpose of the present invention, impact strength is determined by measuring the Izod impact strength at 23° C. according to ISO 180 4A, Test geometry: 65*12.7*3.2 mm, notch 45° according to ISO 37/2 parallel and perpendicular orientation.

For purpose of the present invention, flow is determined by measuring the melt flow rate, also called melt flow index or melt index according to ISO1133 (2.16 kg/230° C.).

For purpose of the present invention, CLTE is measured according to ASTM D696 in parallel and perpendicular direction. Two types of temperature changes are employed for the measurements: a temperature change from 20° C. to 80° C. and a temperature change from −30° C. to 30° C.

For purpose of the present invention, shrinkage 3-D is measured according to ISO 294-4. Two types of shrinkage are measured: shrinkage after 24 hours at 23° C. and shrinkage after 24 hours at 23° C. followed by 1 hour at 90° C.

The results are summarized in Table 1. In the Tables:
RC is the rubber content (propylene-ethylene copolymer) in the heterophasic copolymer; RCC2 is the C2 (ethylene) content in the rubber part of the polymer.

RC and RCC2 were measured with IR spectroscopy, which was calibrated using NMR according to known procedures.

MFI heterophasic copolymer is the MFI of the starting heterophasic copolymer consisting of the matrix and the rubber.

MFI final is the MFI of the final extruded composition of the heterophasic copolymer and additives such as talc, nucleating composition and peroxide.

Properties in the parallel and perpendicular directions are indicated with "II" and "L", respectively.

Comparative experiments and further experiments were performed and properties were measured as summarized in Tables 1-6.

TABLE 1

| Medium MFI composition | | | | | | |
|---|---|---|---|---|---|---|
| | CEx 1 | CEx 2 | CEx 3 | Ex 1 | CEx 4 | CEx 5 |
| Matrix (wt % based on the heterophasic copolymer) | 75.5 | 75.5 | 75.5 | 75.5 | 75.5 | 75.5 |
| RC (wt % based on the heterophasic copolymer) | 24.5 | 24.5 | 24.5 | 24.5 | 24.5 | 24.5 |
| RCC2 (wt %) | 56.5 | 56.5 | 56.5 | 56.5 | 56.5 | 56.5 |
| MFI matrix (dg/min) | 4.7 | 4.7 | 4.7 | 4.7 | 4.7 | 4.7 |
| MFI rubber (dg/min) | 0.044 | 0.044 | 0.044 | 0.044 | 0.044 | 0.044 |
| MFI heterophasic copolymer (dg/min) | 1.5 | 1.5 | 1.5 | 1.5 | 1.5 | 1.5 |
| MFI final (dg/min) | 14 | 14 | 14 | 14 | 14 | 14 |
| Talc (wt %) | 0 | 2.5 | 0 | 2.5 | 0 | 2.5 |

TABLE 1-continued

| | Medium MFI composition | | | | | |
|---|---|---|---|---|---|---|
| | CEx 1 | CEx 2 | CEx 3 | Ex 1 | CEx 4 | CEx 5 |
| HPN20 (wt %) | 0 | 0 | 0.05 | 0.05 | 0 | 0 |
| ADK NA27 (wt %) | 0 | 0 | 0 | 0 | 0.1 | 0.1 |
| Irganox B225 (stabilizer) (wt %) | 0.2 | 0.2 | 0.2 | 0.2 | 0.2 | 0.2 |
| Acid scavenger Calcium stearate (wt %) | 0.05 | 0.05 | 0.05 | 0.05 | 0.05 | 0.05 |
| Peroxide (wt %) | 0.12 | 0.12 | 0.12 | 0.12 | 0.12 | 0.12 |
| Flexural Modulus L (MPa) | 958 | 1137 | 1107 | 1202 | 1144 | 1207 |
| Flexural Modulus II (MPa) | 963 | 1127 | 1107 | 1198 | 1196 | 1274 |
| Izod Impact L (23° C., kJ/m$^2$) | 59.85 | 66.23 | 61.4 | 66.76 | 56.64 | 60.48 |
| Izod Impact II (−20° C., kJ/m$^2$) | 6.79 | 7.87 | 7.99 | 8.11 | 7.25 | 6.97 |

Comparison of CEx 2, CEx 3 and Ex 1 shows that the combination of talc and HPN20 has a synergistic effect on the flexural modulus.

Comparison of CEx 1 and CEx 4 shows that ADK NA27 also increases the flexural modulus, but the izod impact L is decreased. Comparison of CEx 1, Ex 1 and CEx 5 also shows that the combination of talc and HPN20 results in increase of both flexural modulus and izod impact, whereas the combination of talc and ADK NA27 results only in increase of flexural modulus. Furthermore, the difference in flexural modulus L and flexural modulus II is small by the use of HPN20. The difference in flexural modulus L and flexural modulus II is larger when ADK NA27 is used.

TABLE 2

| | Medium MFI composition | | | | |
|---|---|---|---|---|---|
| | Ex 1 | Ex 2 | Ex 3 | Ex 4 | Ex 5 |
| Matrix (wt % based on the heterophasic copolymer) | 75.5 | 75.5 | 75.5 | 75.5 | 75.5 |
| RC (wt % based on the heterophasic copolymer) | 24.5 | 24.5 | 24.5 | 24.5 | 24.5 |
| RCC2 (wt %) | 56.5 | 56.5 | 62 | 56.5 | 62 |
| MFI matrix (dg/min) | 4.7 | 4.7 | 4.3 | 4.7 | 4.3 |
| MFI rubber (dg/min) | 0.044 | 0.044 | 0.04 | 0.044 | 0.04 |
| MFI heterophasic copolymer (dg/min) | 1.5 | 1.5 | 1.4 | 1.5 | 1.4 |

TABLE 2-continued

| | Medium MFI composition | | | | |
|---|---|---|---|---|---|
| | Ex 1 | Ex 2 | Ex 3 | Ex 4 | Ex 5 |
| MFI final (dg/min) | 14 | 14 | 14 | 20 | 20 |
| Talc (wt %) | 2.5 | 0.5 | 0.5 | 0.5 | 0.5 |
| HPN20 (wt %) | 0.05 | 0.025 | 0.025 | 0.025 | 0.025 |
| ADK NA27 | 0 | 0 | 0 | 0 | 0 |
| Irganox B225 (stabilizer) (wt %) | 0.2 | 0.2 | 0.2 | 0.2 | 0.2 |
| Acid scavenger Calcium stearate (wt %) | 0.05 | 0.05 | 0.05 | 0.05 | 0.05 |
| Peroxide (wt %) | 0.12 | 0.12 | 0.12 | 0.18 | 0.18 |
| Flexural Modulus L (MPa) | 1202 | 1128 | 1257 | 1135 | 1264 |
| Flexural Modulus II (MPa) | 1198 | 1127 | 1242 | 1108 | 1254 |
| Izod Impact L (23° C., kJ/m$^2$) | 66.76 | 62.78 | 11.23 | 59.69 | 10.47 |
| Izod Impact II (−20° C., kJ/m$^2$) | 8.11 | 7.62 | 5.9 | 7.3 | 5.8 |

Comparison of Ex 2 and Ex 3, and Ex 4 and Ex 5 shows that the ethylene content in the ethylene-propylene copolymer rubber has an extremely large impact on the izod impact strength.

TABLE 3

| | Medium MFI composition | | | | | |
|---|---|---|---|---|---|---|
| | CEx 1 | CEx 6 | Ex 2 | CEx 7 | CEx 8 | Ex 4 |
| Matrix (wt % based on the heterophasic copolymer) | 75.5 | 75.5 | 75.5 | 75.5 | 75.5 | 75.5 |
| RC (wt % based on the heterophasic copolymer) | 24.5 | 24.5 | 24.5 | 24.5 | 24.5 | 24.5 |
| RCC2 (wt %) | 56.5 | 56.5 | 56.5 | 56.5 | 56.5 | 56.5 |
| MFI matrix (dg/min) | 4.7 | 20 | 4.7 | 4.7 | 20 | 4.7 |
| MFI rubber (dg/min) | 0.044 | 0.2 | 0.044 | 0.044 | 0.2 | 0.044 |
| MFI heterophasic copolymer (dg/min) | 1.5 | 6.3 | 1.5 | 1.5 | 6.3 | 1.5 |

TABLE 3-continued

| | Medium MFI composition | | | | | |
|---|---|---|---|---|---|---|
| | CEx 1 | CEx 6 | Ex 2 | CEx 7 | CEx 8 | Ex 4 |
| MFI final (dg/min) | 14 | 14 | 14 | 20 | 20 | 20 |
| Talc (wt %) | 0 | 0 | 0.5 | 0 | 0 | 0.5 |
| HPN20 (wt %) | 0 | 0 | 0.025 | 0 | 0 | 0.025 |
| ADK NA27 | 0 | 0 | 0 | 0 | 0 | 0 |
| Irganox B225 (stabilizer) (wt %) | 0.2 | 0.2 | 0.2 | 0.2 | 0.2 | 0.2 |
| Acid scavenger Calcium stearate (wt %) | 0.05 | 0.05 | 0.05 | 0.05 | 0.05 | 0.05 |
| Peroxide (wt %) | 0.12 | 0.06 | 0.12 | 0.18 | 0.08 | 0.18 |
| Flexural Modulus L (MPa) | 958 | 1127 | 1128 | 930 | 1134 | 1135 |
| Flexural Modulus II (MPa) | 963 | 1121 | 1127 | 919 | 1115 | 1108 |
| Izod Impact L (23° C. kJ/m$^2$) | 59.85 | 13.11 | 62.78 | 59.85 | 13.6 | 59.69 |
| Izod Impact II (−20° C., kJ/m$^2$) | 6.79 | 6.19 | 7.62 | 6.79 | 6.63 | 7.3 |

Comparison of CEx 1 and CEx 6, and CEx 7 and CEx 8 shows that the increase in the MFI of the matrix leads to an increase in the flexural modulus and a large decrease in the izod impact strength.

Comparison of CEx 1 and Ex 2, and CEx 7 and Ex 4 shows that the addition of both talc and HPN20 increases flexural modulus while maintaining the izod impact strength.

TABLE 4

| High MFI composition | |
|---|---|
| Composition | |
| Matrix (wt % based on the heterophasic copolymer) | 81.5 |
| RC (wt % based on the heterophasic copolymer) | 18.5 |
| RCC2 (wt %) | 53 |
| MFI matrix (dg/min) | 82 |

TABLE 4-continued

| High MFI composition | |
|---|---|
| Composition | |
| MFI rubber (dg/min) | 0.6 |
| MFI heterophasic copolymer (dg/min) | 33 |
| MFI final (dg/min) | 55 |
| Talc (wt %) | 0.5 |
| HPN20 (wt %) | 0.025 |
| Irganox B225 (stabilizer) (wt %) | 0.2 |
| Acid scavenger Calcium stearate (wt %) | 0.05 |
| Peroxide (wt %) | 0.026 |
| Flexural Modulus II (MPa) | 1536 |
| Izod Impact L (23° C., kJ/m$^2$) | 6.3 |

A thermoplastic composition was obtained having a good flexural modulus and a sufficient level of impact strength.

TABLE 5

| | Medium MFI composition | | | | | |
|---|---|---|---|---|---|---|
| | CEx 9 | CEx 10 | CEx 11 | CEx 12 | Ex 6 | CEx 13 |
| Matrix (wt % based on the heterophasic copolymer) | 75.5 | 75.5 | 75.5 | 75.5 | 75.5 | 75.5 |
| RC (wt % based on the heterophasic copolymer) | 24.5 | 24.5 | 24.5 | 24.5 | 24.5 | 24.5 |
| RCC2 (wt %) | 56.5 | 56.5 | 56.5 | 56.5 | 56.5 | 56.5 |
| MFI matrix (dg/min) | 4.7 | 4.7 | 4.7 | 4.7 | 4.7 | 4.7 |
| MFI rubber (dg/min) | 0.044 | 0.044 | 0.044 | 0.044 | 0.044 | 0.044 |
| MFI heterophasic copolymer (dg/min) | 1.5 | 1.5 | 1.5 | 1.5 | 1.5 | 1.5 |
| MFI final (dg/min) | 15.5 | 13.3 | 14.3 | 13.6 | 12.5 | 14.7 |
| Talc (wt %) | 0 | 0.5 | 0 | 0 | 0.5 | 0.5 |
| HPN20E (wt %) | 0 | 0 | 0.025 | 0 | 0.025 | 0 |
| HPN68L (wt %) | 0 | 0 | 0 | 0.05 | 0 | 0.05 |
| Irganox B225 (stabilizer) (wt %) | 0.2 | 0.2 | 0.2 | 0.2 | 0.2 | 0.2 |
| Acid scavenger Calcium stearate (wt %) | 0.05 | 0.05 | 0.05 | 0.05 | 0.05 | 0.05 |
| Peroxide (wt %) | 0.12 | 0.12 | 0.12 | 0.12 | 0.12 | 0.12 |
| Flexural Modulus L (23 C., MPa) | 1068 | 1112 | 1166 | 1126 | 1192 | 1173 |
| Flexural Modulus II (23 C., MPa) | 1066 | 1100 | 1182 | 1133 | 1187 | 1155 |
| Izod impact L (23° C., kJ/m2) | 57.06 | 57.81 | 58.37 | 55.98 | 58.43 | 53.64 |
| Izod impact L (−20° C., kJ/m2) | 7.06 | 7.08 | 7.51 | 7.34 | 7.3 | 6.9 |
| CLTE 20° C.-80° C. L (μm/m · K) | 152.5 | 147.4 | 142.1 | 155.4 | 140.8 | 154.5 |

TABLE 5-continued

| Medium MFI composition | | | | | | |
|---|---|---|---|---|---|---|
| | CEx 9 | CEx 10 | CEx 11 | CEx 12 | Ex 6 | CEx 13 |
| CLTE −30° C.-30° C. L (μm/m · K) | 110.9 | 108.4 | 104.6 | 113.6 | 101.3 | 113.6 |
| CLTE 20° C.-80° C. II (μm/m · K) | 154.1 | 144.6 | 138.1 | 150.2 | 134.4 | 149.3 |
| CLTE −30° C.-30° C. II (μm/m · K) | 107.7 | 103.6 | 98.3 | 106.6 | 94.8 | 105.1 |
| Shrinkage after 24 hrs at 23° C. L (%) | 1.5053 | 1.4588 | 1.4757 | 1.5731 | 1.4451 | 1.5935 |
| Shrinkage after 24 hrs at 23° C. + 1 hr at 90° C. L (%) | 1.7338 | 1.6550 | 1.6753 | 1.8436 | 1.6414 | 1.8254 |

Comparison of CEx 10, 11 and Ex6 shows that the combination of talc and HPN20 has a synergistic effect on the flexural modulus, CLTE and shrinkage.

Comparison of Ex6 and CEx13 shows that the combination of talc and HPN20 is superior than the combination of talc and HPN68 in terms of the flexural modulus, impact strength, CLTE and shrinkage. Furthermore, the combination of talc and HPN20 results in similar flexural modulus L and II, in comparison with the combination of talc and HPN68 which results in a large difference between flexural modulus L and II. The large difference between flexural modulus L and II causes a large internal stress which is unfavorable.

Comparison of CEx9, Ex6 and CEx13 also shows that the combination of talc and HPN20 results in improvements on the flexural modulus as well as CLTE and shrinkage, whereas the combination of talc and HPN 68 results only in increase of the flexural modulus.

TABLE 6

| High MFI composition | | | | | | |
|---|---|---|---|---|---|---|
| | CEx 14 | CEx 15 | CEx 16 | CEx 17 | Ex 7 | CEx 18 |
| Matrix (wt % based on the heterophasic copolymer) | 81.5 | 81.5 | 81.5 | 81.5 | 81.5 | 81.5 |
| RC (wt % based on the heterophasic copolymer) | 18.5 | 18.5 | 18.5 | 18.5 | 18.5 | 18.5 |
| RCC2 (wt %) | 53 | 53 | 53 | 53 | 53 | 53 |
| MFI matrix (dg/min) | 82 | 82 | 82 | 82 | 82 | 82 |
| MFI rubber (dg/min) | 0.6 | 0.6 | 0.6 | 0.6 | 0.6 | 0.6 |
| MFI heterophasic copolymer (dg/min) | 33 | 33 | 33 | 33 | 33 | 33 |
| MFI final (dg/min) | 53.4 | 56.0 | 47.0 | 55.7 | 48.7 | 48.8 |
| Talc (wt %) | 0 | 0.5 | 0 | 0 | 0.5 | 0.5 |
| HPN20E (wt %) | 0 | 0 | 0.025 | 0 | 0.025 | 0 |
| HPN68L (wt %) | 0 | 0 | 0 | 0.05 | 0 | 0.05 |
| Irganox B225 (stabilizer) (wt %) | 0.2 | 0.2 | 0.2 | 0.2 | 0.2 | 0.2 |
| Acid scavenger Calcium stearate (wt %) | 0.05 | 0.05 | 0.05 | 0.05 | 0.05 | 0.05 |
| Peroxide (wt %) | 0.026 | 0.026 | 0.026 | 0.026 | 0.026 | 0.026 |
| Flexural Modulus L (23° C., MPa) | 1303 | 1424 | 1551 | 1515 | 1612 | 1566 |
| Flexural Modulus II (23° C., MPa) | 1320 | 1426 | 1566 | 1501 | 1589 | 1544 |
| Izod impact L (23° C., kJ/m2) | 6.41 | 5.95 | 6.6 | 5.71 | 5.98 | 5.7 |
| Izod impact L (−20° C., kJ/m2) | 3.41 | 3.56 | 4.08 | 3.55 | 3.59 | 3.7 |
| CLTE 20° C.-80° C. L (μm/m · K) | 148.6 | 135.6 | 130.1 | 143.3 | 122.3 | 143.3 |
| CLTE −30° C.-30° C. L (μm/m · K) | 108.3 | 96.2 | 89.4 | 105.1 | 89.5 | 104.8 |
| CLTE 20° C.-80° C. II (μm/m · K) | 146.2 | 136.8 | 125.0 | 139.6 | 120.4 | 137.7 |
| CLTE −30° C.-30° C. II (μm/m · K) | 103.8 | 94.3 | 83.5 | 98.0 | 84.9 | 95.9 |
| Average shrinkage after 24 hrs at 23° C. (%) | 1.4183 | 1.4071 | 1.4150 | 1.4917 | 1.3884 | 1.4915 |
| Average shrinkage after 24 hrs at 23° C. + 1 hr at 90° C. (%) | 1.6150 | 1.5715 | 1.6333 | 1.8254 | 1.5426 | 1.8183 |

Comparison of CEx15, CEx16 and Ex7 shows that the combination of talc and HPN20 has a synergistic effect on the flexural modulus, CLTE and shrinkage.

Comparison of Ex7 and CEx18 shows that the combination of talc and HPN20 is superior than the combination of talc and HPN68 in terms of the flexural modulus, impact strength, CLTE and shrinkage.

Comparison of CEx14, Ex7 and CEx18 also shows that the combination of talc and HPN20 results in large improvements on the flexural modulus as well as CLTE and shrinkage, whereas the combination of talc and HPN 68 does not result in a large improvement in CLTE and the shrinkage is worsened.

The invention claimed is:

1. A thermoplastic polymer composition, comprising thermoplastic polymer,
an organic peroxide, and
a nucleating composition comprising:
(a) a first nucleating agent, which comprises a cyclic dicarboxylate salt compound; and
(b) a second nucleating agent, which comprises talc,
wherein the cyclic dicarboxylate salt compound has the formula (I):

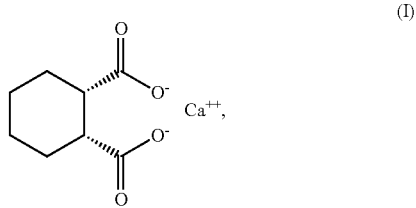

(I)

wherein said thermoplastic polymer is a heterophasic propylene copolymer comprising a matrix phase comprising propylene and a dispersed phase comprising an ethylene-alpha-olefin elastomer, wherein the heterophasic propylene copolymer has a melt flow index of at least 1 dg/min.

2. The thermoplastic polymer composition according to claim 1,
wherein the heterophasic propylene copolymer comprises from 60 to 92 wt % of the matrix phase and from 8 to 40 wt % of the dispersed phase,
wherein the matrix phase comprises a propylene homopolymer and/or a propylene copolymer comprising at least 90 wt % of propylene and up to 10 wt % of ethylene and/or at least one $C_4$ to $C_{10}$ alpha-olefin, and
wherein the ethylene-alpha-olefin elastomer of the dispersed phase comprises from 40 to 65 wt % of ethylene and from 35 to 60 wt % of at least one $C_3$ to $C_{10}$ alpha-olefin.

3. The thermoplastic polymer composition according to claim 1, wherein the heterophasic propylene copolymer has a melt flow index of less than 10 dg/min.

4. The thermoplastic polymer composition according to claim 3, wherein the matrix phase has a melt flow index of at least 1 dg/min.

5. The thermoplastic polymer composition according to claim 3, wherein the ethylene-alpha-olefin elastomer comprises from 40 to 60 wt % of ethylene and from 40 to 60 wt % of propylene.

6. The thermoplastic polymer composition according to claim 3, wherein the thermoplastic polymer composition has a melt flow index of at least 5 and less than 30 dg/min.

7. The thermoplastic polymer composition according to claim 3, wherein the thermoplastic polymer composition has a flexural modulus L of at least 1000 MPa.

8. The thermoplastic polymer composition according to claim 3, wherein the thermoplastic polymer composition has an Izod impact strength L (23° C., kJ/m$^2$) of at least 55.

9. The thermoplastic polymer composition according to claim 3,
wherein the thermoplastic polymer composition has a melt flow index of at least 5 and less than 30 dg/min,
wherein the matrix phase has a melt flow index of at least 1 dg/min and less than 50 dg/min,
wherein the ethylene-alpha-olefin elastomer comprises from 40 to 60 wt % of ethylene and from 40 to 60 wt % of propylene,
wherein the thermoplastic polymer composition has a flexural modulus L of at least 1000 MPa, and
wherein the thermoplastic polymer composition has an Izod impact strength L (23° C., kJ/m$^2$) of at least 55.

10. The thermoplastic polymer composition according to claim 9,
wherein the thermoplastic polymer composition has a flexural modulus L of at least 1100 MPa,
wherein the thermoplastic polymer composition has an Izod impact strength L (23° C., kJ/m$^2$) of at least 60.

11. A shaped article comprising the thermoplastic polymer composition according to claim 9.

12. The thermoplastic polymer composition according to claim 1, wherein the heterophasic propylene copolymer has a melt flow index of at least 10 dg/min.

13. The thermoplastic polymer composition according to claim 12, wherein the matrix phase has a melt flow index of at least 50 dg/min.

14. The thermoplastic polymer composition according to claim 13, wherein the thermoplastic polymer composition has a melt flow index of at least 30 dg/min.

15. The thermoplastic polymer composition according to claim 12, wherein the thermoplastic polymer composition has a flexural modulus L of at least 1400 MPa.

16. The thermoplastic polymer composition according to claim 12, wherein the thermoplastic polymer composition has an Izod impact strength L (23° C., kJ/m$^2$) of at least 5.

17. A shaped article comprising the thermoplastic polymer composition according to claim 1.

18. The thermoplastic polymer composition according to claim 1,
wherein the heterophasic propylene copolymer has a melt flow index of at least 10 dg/min,
wherein the matrix phase has a melt flow index of at least 50 dg/min,
wherein the thermoplastic polymer composition has a melt flow index of at least 30 dg/min,
wherein the thermoplastic polymer composition has a flexural modulus L of at least 1400 MPa, and
wherein the thermoplastic polymer composition has an Izod impact strength L (23° C., kJ/m$^2$) of at least 5.

19. The thermoplastic polymer composition according to claim 18,
wherein the thermoplastic polymer composition has a flexural modulus L of at least 1400 MPa, and
wherein the thermoplastic polymer composition has an Izod impact strength L (23° C., kJ/m$^2$) of at least 6.

20. A shaped article comprising the thermoplastic polymer composition according to claim 18.

* * * * *